United States Patent Office 3,686,163
Patented Aug. 22, 1972

3,686,163
DIHYDRODAUNOMYCIN ANTIBIOTIC AND DERIVATIVES THEREOF
Federico Arcamone, Milan, Giuseppe Cassinelli, Rivanazzano, and Sergio Penco and Luigi Tognoli, Milan, Italy, assignors to Società Farmaceutici Italia, Milan, Italy
No Drawing. Filed May 13, 1969, Ser. No. 824,282
Claims priority, application Italy, May 14, 1968, 86,444/68
Int. Cl. C07c 47/18
U.S. Cl. 260—210 AB                                6 Claims

ABSTRACT OF THE DISCLOSURE

Described is a microbiological process for the preparation of the antibiotic substances dihydrodaunomycin, daunosaminildaunomycin and dihydrodaunomycinone and their salts with pharmaceutically acceptable non-toxic acids. The process comprises growing the microorganism *Streptomyces peucetius* var. *carneus* under aerobic conditions.

---

Our invention relates to antibiotic substances, their derivatives and the preparation thereof. More particularly, the new antibiotic substances of the indicator type called dihydrodaunomycin, danuosaminildaunomycin, their salts, the aglycone dihydrodaunomycinone and their preparation from cultures of *Streptomyces peucetius* var. *carneus* are described. The new antibiotic substances dihydrodaunomycin, daunosaminildaunomycin and dihydrodaunomycinone, which we have also named respectively B–111, B–107 and B–112, possess interesting pharmacological activities particularly as antitumoral, antibacteric, antiviral and antiprotozoal agents.

The new strain *Streptomyces peucetius* var. *carneus* which produces the new antibiotics, called also Streptomyces F.I.65 (number of the strain collection of Società Farmaceutici Italia) has been deposited, without reservation, at the Institute of Plant Pathology of the University of Milan receiving the number I.P.V. 1950; at the American Type Culture Collection, Rockville, Md. 20852, receiving the index number A.T.C.C. 21354, and the Commonwealth Mycological Institute, Ferry Lane, Kew, Surrey, England, receiving the index number I.M.I. 136,533. It shows the following characteristics.

MICROSCOPIC CHARACTERISTICS

The vegetative mycelium, on the usual cultural media, consists of thin hyphae (0.5–0.9 m$\mu$ thick) more or less long and branched. These ramifications bear thicker hyphae (1.1–1.6 m$\mu$ thick), which are called conidiophores. These are often spherical and ending in hooks. The conidia have a spherical form and a diameter of from 1.8 to 3.3 m$\mu$. They are first disposed in little chains, then free. Under the electron microscope, the conidia show a form nearly spherical, with irregular surroundings and warty surface.

MACROSCOPIC CHARACTERISTICS

Table 1 reports the macroscopic characteristics, on the indicated media, by growing the microorganism at 28° C. and carrying out observations 3, 8, 15, 21 and 30 days after inoculation.

BIOCHEMICAL CHARACTERISTICS

Gelatine: total hydrolysis
Starch: total hydrolysis
Nitrates: no reduction to nitrites
$H_2S$: slight production
Melanoid pigments: no production
Milk: neither coagulation nor peptonization The microorganism utilizes: tyrosine, d-xylose, maltose, mannose, mannitol, glycerin, glucose, saccharose, threalose, raffinose, fructose and mannite; it does not utilize lactose, adonitol, ramnose, sorbitol, 1-arabinose, mesoinositol and esculine. In liquid submerged and aerated culture the strain produces antibiotic substances.

IDENTIFICATION OF THE STRAIN

The description of the microorganism under examination places it in the classification system of Pridham et al. (Appl. Microbiol., 6, pg. 52, 1958) in the section *Retinaculum apertum*. In the classification system of Baldacci (Giorn. di Microbiol., 6, pg. 10, 1958), the microorganism belongs to the series *Albosporeus*. In the system of Waksman (The Actinomycetes, vol. II, pg. 129, 1961) the microorganism belongs to the series Ruber. A comparison between the characteristics of the microorganism and those of species belonging to the cited systematic groups (Taxa), has shown that none of them has characteristics corresponding to those of the microorganism under examination. Table 2 reports the data of this comparison as for the species producing substances similar to those we have studied. In the table are data referred to *Streptomyces*

TABLE 1.—Cultural characteristics of *Streptomyces peucetius* var. *carneus*

| Medium | Growth | Aerial mycelium | Vegetative mycelium | Soluble pigments |
|---|---|---|---|---|
| Malt yeast extract agar (Sec. Hesseltine et al.).[1] | Little confluent colonies with wrinkled folds, hard, relieved, abundant. | Very scarce, smooth, green-gray colored; absence of spirals and verticils. | Abundant, yellowish, then red-yellow. | Intense, first red-yellow, then brown-red. |
| Bennet agar | Scarce with little single yellowish colonies. | Absent | Fair, vinaceous pink | Absent. |
| Emerson agar | Fair with little confluent colonies in lichenoid, no hard patina. | do | Fair, colorless | Reddish-plae brown. |
| Potato agar (Sec. Hesseltine et al.).[1] | Abundant in smooth uniform patina. | Abundant, blue-green-gray; hook-ended and then loop-ended hyphae. | Abundant, flesh-colored; smooth, hard patina. | Intense, first reddish-yellow, then dark-orange. |
| Peptone agar + $KNO_3$ | Abundant in little confluent colonies. | Absent | Abundant, colorless | Absent. |
| Czapek agar | Abundant in little confluent colonies. | Scanty, dirty white, slightly cottony; hook and loop-ended hyphae. | Abundant, bright flesh-pink- colored. | Do. |
| Asparagine-glucose agar | Scanty in single little colonies. | Scanty, whitish-pink; very broken mycelium, short, without apical hooks. | Scanty, colorless | Do. |
| Glycerin-glycine agar | Abundant in smooth, hard patina. | Absent | Abundant from yellow to light orange, | Do. |
| Starch agar | Scanty in single little colonies. | Fair, from blue-green to gray-green. | Scanty, colorless then pink-yellowish. | Do. |
| Gelatine | Moderate in surface | Absent | Moderate, from colorless to yellowish. | Abundant, dark brown-black. |
| Milk | Scanty | do | Scanty, ring-formed in surface, rose-salmon colored. | Scanty, pink. |

[1] Hesseltine et al., 1954 Ann. N.Y. Acad. Sci. 60, pp. 136–151.

cinereoruber, Streptomyces cinereoruber var. fructofermentans, Streptomyces caespitosus and Streptomyces antibioticus even if they do not belong to the Taxa.

The differences from species which do not produce substances of the examined type, similar to our invention, are: Our microorganism differs from the species Streptomyces albosporeus (Waksman: The Actinomycetes, vol. II, 1961, pg. 171), because the latter does not produce soluble pigment, reduces the nitrates and does not produce hydrogen sulphide; from Streptomyces cinnamonensis (Waksman: The Actinomycetes, vol. II, 1961, pg. 195–196) and from Streptomyces fradiae (Waksman: The Actinomycetes, vol. II, 1961, pg. 211–212) because of the color of the vegetative and aerial mycelium; from the species Streptomyces ruber )Waksman: The Actinomycetes, vol. II, 1961, pg. 271) because the latter coagulates milk, produces no soluble pigment and no hydrogen sulphide; from Streptomyces rubescens (Waksman: The Actinomycetes, vol. II, 1961, pg. 271) because of the color of the aerial mycelium and because Streptomyces rubescens does not form any soluble pigments and does not produce hydrogen sulphide; from Streptomyces ordiosporus (Waksman: The Actinomycetes, vol. II, 1961, pg. 251) because it does not reduce the nitrates and does not peptonize milk. Besides, Streptomyces oidiosporus does not form soluble pigments.

the former and of flesh-pink tonalities on the latter; (c) on the Emerson medium, the vegetative mycelium gets a consistence and an aspect lichen-like and the back side of the culture is colorless; (d) on the starch and salts medium, an abundant blue-green aerial mycelium, which has clearly gray-green tonalities, develops; (e) on the potato-glucose medium, no formation of aerial mycelium is observed; (f) it produces the antibiotics dihydrodaunomycin (B-111), daunosaminildaunomycin (B-107) and dihydrodaunomycinone (B-112) in a submerged liquid culture.

We thus conclude that the microorganism under examination is to be considered as a variety of Streptomyces peucetius for which we propose the name Streptomyces peucetius var. carneus.

The microorganism Streptomyces peucetius var. carneus may be stored for successive transfers on the medium B (the composition is described in Example 1) or by lyophilization of a mycelium suspension of a culture on the medium B. By fermenting the new microorganism, Strepto- We thus conclude that the microorganism under examination is different from all the species producing similar antibiotic substances and more generally it differs from all the species belonging to the subgeneric systematic groups to which this strain belongs. Streptomyces peucetius var. carneus differs from the Streptomyces peucetius (Giornale de Microbiologia, vol. 11, 1963, pg. 109) because: (a) it forms an abundant gray-green aerial mycelium on the yeast-tyrosine extract medium, while both the vegetative mycelium and the back side of the culture are colorless; (b) on the Bennet and Czapek media, the vegetative mycelium shows bright colors of wine tonalities TABLE 2.—Comparison between streptomyces peucetius var. carneus and species producing substances similar to the antibiotic under examination

| | Streptomyces peucetius var. carneus | Streptomyces purpurascens | Strept. bobiliae | Streptomyces cinereoruber | Strept. cinereoruber, var. fructofermentans | Strept. caespitosus | Strept. niveoruber | Strept. galilaeus | Strept. antibioticus | Strept. A 1165 (Asheshov et al.; Antib. and Chemoth. 4, 380, 1954) | Strept. A 220 (Asheshov et al.; Antib. and Chemoth. 4, 380, 1954) | Strept. DOA 1205 (Brockman: Chem. Ber. 92, 1880, 1959) |
|---|---|---|---|---|---|---|---|---|---|---|---|---|
| Sporophores | Straight or hooked-like. | Spirally | Spirally | Straight or hooked-like. | Straight or hooked-like. | Vertically | Spirally | Spirally | Straight | Not described | Not described | Spirally. |
| Spores | Roundish, warty 1.8–3.3 μ. | Oval spiny 0.8–1 μ per 0.4–0.5 μ. | | Oval smooth 0.7–1 μ per 0.3–0.5 μ. | Oval smooth 0.7–1 μ per 0.9–2 μ. | Oval smooth 0.5–1.3 μ per 0.3–0.5 μ. | Smooth | Smooth | Smooth spherical. | do | do | Not described. |
| Vegetative Mycelium. | From colorless to yellow-red sometimes lichenoid-like. | Red | Coral red | Yellow-red borown. | Ash-gray | From cream to brown to yellow-red-dish. | Carmine-red | Carmine-red | Yellow-creamy. | do | do | Brick-red vinous-red. |
| Aerial Mycelium. | Blue-green to gray-green. | White-pink | White | Ash-gray | do | White yellow-ish gray. | Whitesh to ash-gray. | From white to ash-gray | From white mouse gray. | | | Red-gray. |
| Reduction of nitrates. | – | / | / | / | / | + | – | / | / | / | / | / |
| Milk (pep. coag.) | – | – | + | + | + | + | – | + | + | | | + |
| L-xylose | + | + | + | + | + | – | | | | | | |
| L-arabinose | – | + | + | + | + | – | | | | | | |
| L-rhamnose | – | + | + | + | + | – | | | | | | |
| Fructose | + | + | + | + | + | + | | | | | | |
| Saccharose | + | + | + | – | + | – | | | | | | |
| Lactose | + | + | + | + | + | – | | | | | | |
| Raffinose | + | + | + | – | + | – | | | | | | |
| D-mannite | – | + | + | – | + | + | | | | | | |
| D-sorbite | – | – | – | – | + | + | | | | | | |
| Antibiotics produced. | Dihydrodauno-mycin; daunosaminil-daunomycin and dihydro-daunomycinone. | Rhodomycins | Cinerubines | Rhodomycins | Cinerubines | Mitomycins | Cinerubines | Cinerubines | Cinerubines | Aklavine | Ruttlantine | Pirromycine. |

NOTE.—+=positive reaction, –=negative reaction, /=data is lacking.

myces peucetius var. carneus, in a cultural medium containing carbon, nitrogen sources and mineral salts, some new antibotic substances have been obtained which possess antitumoral, antibacteric, antiviral and antiprotozoal activity. More particularly, the dihydrodaunomycin, daunosaminildaunomycin and dihydrodaunomycinone production is carried out by cultivating Streptomyces peucetius var. carneus in a liquid cultural medium, previously sterilized, under aerobic conditions, from 25° to 35° C., over a period of from 4 to 7 days, at a pH of from 6.5 to 8.

The cultural medium consists of a carbon and a nitrogen source and mineral salts. The carbon source may consist of starch, dextrine, glucose, glycerin, mannite, maltose, corn steep liquor, distillers solubles, soybean oil and soybean meal. The nitrogen source may consist, besides the complex substances containing nitrogen mentioned above, of dry yeast, flesh peptone and/or casein. Good results are also obtained using ammonium salts such as nitrate, sulphate and diphosphate. Suitable mineral salts for the production of antibiotics vary according to the medium employed. Calcium carbonate is almost always present and chlorides, sulphates, phosphates, etc. of sodium, potassium, magnesium, manganese, iron, copper, zinc and cobalt can be added.

The fermentation is carried out in Erlenmeyer flasks or in laboratory and industrial fermenters of various capacity. When the fermentation is over, the antibiotic substances dihydrodaunomycin, daunosaminildaunomycin and dihydrodaunomycinone are extracted from the culture broth, with suitable solvents under suitable conditions and separated by chromatography and then purified. The quantity of antibiotics present in the culture broths is determined spectrophotometrically and then compared with samples of known antibiotics.

CHEMICAL-PHYSICAL PROPERTIES

The antibiotic substances dihydrodaunomycin, daunosaminildaunomycin and dihydrodaunomycinone show the following chemical structure:

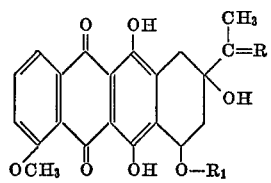

wherein the formula represents the antibiotic dihydrodaunomycin when R is

and $R_1$ is the radical daunosaminil

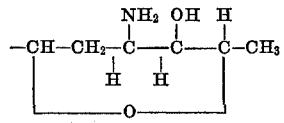

the formula represents the antibiotic daunosaminildaunomycin when R is=0, $R_1$ is the radical daunosaminil and a second radical daunosaminil is bound glycosidically to one of the free hydroxy groups of the molecule; and the formula represents the antibiotic dihydrodaunomycinone when R is

and $R_1$ is a hydrogen atom.

The elementary analysis of the dihydrodaunomycin hydrochloride gives the following values:

Empirical formula: $C_{27}H_{31}O_{10}N \cdot HCl$.—Found (percent): C, 57.16; H, 6.01; N, 2.68; Cl, 5.86. Calculated (percent): C, 57.29; H, 5.71; N, 2.47; Cl, 6.26.

The absorption spectrum in the U.V. and in the visible ranges gives, in methanol, adsorption maxima at the following wave lengths:

at 233 m$\mu$ $E_{1cm.}^{1\%}$=590     at 479 m$\mu$ $E_{1cm.}^{1\%}$=220 at 252 m$\mu$ $E_{1cm.}^{1\%}$=430     at 496 m$\mu$ $E_{1cm.}^{1\%}$=223 at 286 m$\mu$ $E_{1cm.}^{1\%}$=140     at 528 m$\mu$ $E_{1cm.}^{1\%}$=130

Important bands are observed in the I.R. spectrum in KBr at the following wave lengths (in $\mu$): 2.94; 3.44; 6.19; 6.32; 6.95; 7.11; 7.25; 7.80; 8.28; 8.95; 9.40; 9.95; 10.18; 11.5; 12.30; 12.65; 13.18.

The elementary analysis of the daunosaminildaunomycin hydrochloride gives the following values:

Empirical formula: $C_{33}H_{40}O_{12}N_2 \cdot 2HCl$. Found percent: C, 54.42; H, 6.17; N, 3.64; Cl, 9.43. Calculated percent: C, 54.32; H, 5.80; N, 3.84; Cl, 9.72.

The adsorption spectrum in the U.V. and in the visible ranges gives, in methanol, adsorption maxima at the following wave lengths:

at 233.5 m$\mu$ $E_{1cm.}^{1\%}$=515    at 477 m$\mu$ $E_{1cm.}^{1\%}$=168 at 251 m$\mu$ $E_{1cm.}^{1\%}$=364     at 497 m$\mu$ $E_{1cm.}^{1\%}$=171 at 290 m$\mu$ $E_{1cm.}^{1\%}$=121     at 531 m$\mu$ $E_{1cm.}^{1\%}$=95

Bands are observed in the I.R. spectrum at the following wave lengths (in m$\mu$): 2.93 (wide); 3.44 (wide); 5.80; 6.18; 6.30; 7.10; 7.78; 8.24; 8.95; 10.05; 12.20; 12.50; 13.10.

Dihydrodaunomycinone may be obtained not only from the culture broths of the Streptomyces peucetius var. carneus, but also by acid hydrolysis of the antibiotic dihydrodaunomycin; its elementary analysis gives the following values:

Empirical formula: $C_{21}H_{20}O_8$. Found percent: C, 62.83; H, 5.16; $OCH_3$, 7.75. Calculated percent: C, 62.90; H, 5.02; $OCH_3$, 7.75.

The adsorption spectrum in the U.V. and in the visible ranges gives, in methanol, adsorption maxima at the following wave lengths:

at 233 m$\mu$ $E_{1cm.}^{1\%}$=780     at 479 m$\mu$ $E_{1cm.}^{1\%}$=295 at 252 m$\mu$ $E_{1cm.}^{1\%}$=610     at 496 m$\mu$ $E_{1cm.}^{1\%}$=310 at 285 m$\mu$ $E_{1cm.}^{1\%}$=185     at 527 m$\mu$ $E_{1cm.}^{1\%}$=180

In the I.R. spectrum are observed remarkable bands at the following wave lengths (in $\mu$): 2.94; 3.44; 6.19; 6.35; 6.92; 7.08; 7.30; 7.84; 8.09; 8.31; 9.38; 9.80; 10.20; 11.38; 12.50; 13.18.

ANTITUMORAL ACTIVITY

The antitumoral activity has been tested "in vitro" on explants of Sarcoma MC, Hela cells and fibroblasts. It has been calculated the Inhibiting Dose$_{50}$ (ID$_{50}$) which means the concentration of the substance capable of inhibiting the mitotic division "in vitro" of 50% of the tested cells.

TABLE 3

| Tested substance | ID$_{50}$ $\mu$g./cc. | | |
|---|---|---|---|
| | Sarcoma MC (explants) | Hela cells | Fibroblasts (rat) |
| Daunosaminildaunomycin | 0.3 | 0.05 | 0.1 |
| Dihydrodaunomycin | 2.5 | 0.25 | 1.25 |
| Dihydrodaunomycinone | | 2 | |

The antitumoral activity has been tested "in vivo" on Swiss cobs mice with a body weight of about 20 g. and on $C_3H/He$ mice. The reduction percent of the tumor development has been listed in Table 4.

TABLE 4

| Tested substance | Percent reduction of the tumor development | |
|---|---|---|
| | Sarcoma 180 mouse | Mammary carcinoma $C_3H/He$ mouse |
| Daunosaminil-daunomycin. | 16% (5 mg./kg./die during 8 days subcutaneously). | 50% (5 mg./kg./die/two cycles of 6 days each and 5 days interval). |
| Dihydrodauno-mycin. | 54% (7 mg./kg./die during 8 days intravenously). | |

ANTIBACTERIAL ACTIVITY

The antibacterial activity has been tested "in vitro" on *Bacillus mycoides* and the Minimum Inhibiting Dose (MID) which means the lowest quantity of the substance capable of totally inhibiting the development "in vitro" of the tested organism, has been calculated.

TABLE 5

| Tested substance: | MID $\gamma$/cc. |
|---|---|
| Daunosaminildaunomycin | 6.25 |
| Dihydrodaunomycin | 12.50 |
| Dihydrodaunomycinone | 20 |

ANTIPROTOZOAL ACTIVITY

The antiprotozoal activity has been tested "in vitro" on *Trichomonas foetus* and *Entamoeba histolytica* and the Inhibiting Dose$_{50}$ (ID$_{50}$) which is the concentration of the substance capable of inhibiting the development "in vitro" of 50% of the tested organism, has been calculated.

TABLE 6

| Tested substance | ID$_{50}$, $\gamma$/cc. | |
|---|---|---|
| | Trichomonas foetus | Entamoeba histolytica |
| Daunosaminildaunomycin | 100 | 80 |
| Dihydrodaunomycin | 100 | 50 |
| Dihydrodaunomycinone | 100 | 100 |

The suspension of the strain *Streptomyces peucetius* without limiting it.

Example 1

The suspension of the strain *Streptomyces peucetius* var. *carneus* obtained from a lyophilized flask was used to inoculate 5–7 slants of a medium having the following composition:

| | Percent |
|---|---|
| Saccharose | 0.2 |
| Bipotassium phosphate | 0.2 |
| Sodium nitrate | 0.2 |
| Magnesium sulphate heptahydrate | 0.2 |
| Dry yeast | 0.5 |
| Tap water to 100. | |

The pH of the medium, uncorrected, was about 7. Agar Difco was added to the medium at the ratio of 2% by weight to the volume of the medium. The medium was sterilized in autoclave at 110° C. for 20 minutes. The inoculated slants were incubated at 28° C. for 7 days, whereafter they were used to inoculate the flasks of a vegetative phase each containing 60 cc. of a medium A, having the following composition:

| | Percent |
|---|---|
| Bacto-peptone | 0.5 |
| Dry yeast | 0.3 |
| Calcium nitrate | 0.05 |
| Tap water to 100. | |

The pH of the medium, uncorrected, was about 7. The flasks were sterilized in autoclave at 110° C. for 20 minutes. The inoculation of each flask consisted in a portion of the surface coat of the mycelium, corresponding to about ¼ of the surface of the slant, homogenized with 2 cc. of distilled water. The flasks were incubated at 28° C. on a rotary shaker at 240 r.p.m. with an eccentricity of 35 mm. After 48 hours of incubation these flasks were used to inoculate the flasks of the production phase, each containing 40 cc. of the medium B, having the following composition:

| | Percent |
|---|---|
| Glucose | 6 |
| Dry yeast | 2.5 |
| Sodium chloride | 0.2 |
| Calcium carbonate | 0.2 |
| Dipotassium hydrogen phosphate | 0.1 |
| Anhydrous magnesium sulphate | 0.01 |
| Iron sulphate heptahydrate | 0.001 |
| Zinc sulphate heptahydrate | 0.001 |
| Copper chloride | 0.001 |
| Ethylendiaminotetraacetic acid neutralized with soda | 0.012 |
| Tap water to 100. | |

The pH of the medium, uncorrected, was 7. It was sterilized in an autoclave at 110° C. for 20 minutes. (Glucose was sterilized separately at 110° C. for 20 minutes.) The inoculation of the production flasks consisted in 2 cc. of the cultures of the vegetative phase. The fermentation conditions were the same used for the vegetative cultures. After 120 hours of incubation, the culture contained 114 $\mu$g./cc. of total pigments (calculated as dihydrodaunomycin on the basis of the adsorption at 496 m$\mu$ of the ethanol extract of an aliquot part of the culture) which include 21 $\mu$g./cc. of dihydrodaunomycin, 4 $\mu$g./cc. of daunosaminildaunomycin and 10 $\mu$g./cc. of dihydrodaunomycinone.

Example 2

Operation is as in Example 1 with the difference that for the vegetative and productive phases, the media L and D respectively were employed. These media have the following composition:

| Vegetative medium L: | Percent |
|---|---|
| Glucose | 1 |
| Broth vegetal extract | 1.5 |
| Casein enzymatic hydrolyizate | 0.3 |
| Tap water to 100. | |

The pH was not corrected. The sterilization was carried out at 120° C. for 20 minutes.

| Productive medium D. | Percent |
|---|---|
| Glucose | 6 |
| Distillers solubles | 2.5 |
| Sodium chloride | 0.2 |
| Calcium carbonate | 0.2 |
| Dipotassium hydrogen phosphate | 0.1 |
| Anhydrous magnesium sulphate | 0.01 |
| Iron sulphate heptahydrate | 0.001 |
| Zinc sulphate heptahydrate | 0.001 |
| Tap water to 100. | |

The pH was corrected to 7 with diluted NaOH. Sterilization was carried out at 110° C. for 20 minutes. The maximum concentration of dihydrodaunomycin, daunosaminildaunomycin and dihydrodaunomycinone was reached on the 6th day of fermentation and it was 66 $\mu$g./cc. of total pigments consisting of 21 $\mu$g./cc. of dihydrodaunomycin, 3$\mu$g./cc. of daunosaminildaunomycin and 8 $\mu$g./cc. of dihydrodaunomycinone.

Example 3

Operating as in Example 1 with the difference that for the productive phase the medium employed has the following composition:

| | Percent |
|---|---|
| Glucose | 7 |
| Chick peas meal | 6.6 |
| Calcium carbonate | 0.2 |
| Sodium chloride | 0.2 |
| Dipotassium hydrogen phosphate | 0.1 |

| | Percent |
|---|---|
| Magnesium sulphate heptahydrate | 0.02 |
| Iron sulphate heptahydrate | 0.001 |
| Zinc sulphate heptahydrate | 0.001 |
| Tap water to 100. | |

Sterilization was carried out at 120° C. for 20 minutes. On the fifth day, we reached the concentration of 72 µg./cc. of total pigments, comprising 22 µg./cc. of dihydrodaunomycin, 4 µg./cc. of daunosaminildaunomycin and 9 µg./cc. of dihydrodaunomycinone.

Example 4

A culture of *Streptomyces peucetius* var. *carneus* on the solid medium described in Example 1 had been used to inoculate 500 cc. of the liquid medium for the vegetative phase described in Example 1, contained in a 2000 cc. flask of embossed Pyrex glass. The mycelium of the slant had been homogenized before inoculation. The flask had been incubated at 28° C. on a rotary shaker at 120 r.p.m., with an eccentricity of 35 mm. for 48 hours. 500 cc. of the vegetative culture thus obtained were used to inoculate, in an 80 liters stainless steel fermenter, 50 liters of a medium consisting of:

| | Percent |
|---|---|
| Peptone | 0.5 |
| Dry yeast | 0.3 |
| Calcium nitrate tetrahydrate | 0.05 |
| Tap water to 100. | |

The fermenter was shaken with turbine disc propellers at 250 r.p.m. and aerated with about 0.7 liter of air per liter of medium per minute at 27° C. After 48 hours of incubation, 25 liters of the mycelium suspension obtained were used to inoculate 500 liters of a fermentation medium in an 800 liters container. The medium had the following composition:

| | Percent |
|---|---|
| Glucose | 6 |
| Dry yeast | 2.5 |
| Sodium chloride | 0.2 |
| Calcium carbonate | 0.2 |
| Dipotassium hydrogen phosphate | 0.1 |
| Magnesium sulphate | 0.01 |
| Iron sulphate heptahydrate | 0.001 |
| Copper chloride | 0.001 |
| Tap water to 100. | |

The medium was previously sterilized at 120° C. and, after inoculation, it was shaken with two turbine disc propellers at 220 r.p.m., aerated with 0.7 liter of air per liter of medium per minute at 27° C. After 130–140 hours of incubation a potency of 69 µg./cc. of total pigments was reached.

50 liters of a filtered fermentation broth, containing 69 µg./cc. of total pigments, corresponding to a total of 3.45 g., were adjusted to pH 2 with 6 N hydrochloric acid and 5 liters of chloroform were added. After 20 minutes of shaking and after separation of the phases, the chloroform extract was collected and evaporated to dryness. The residue, washed with petroleum ether, consisted of 874 mg. of a red-brown product which, after two crystallizations from glacial acetic acid, gave 240 mg. of dihydro daunomycinone having melting point at 230–232° C. $[\alpha]_D^{20°\,C.} = +75°$ C. (c.=0.05 in dioxane).

A mixture of 20 cc. of salicylic aldehyde and 200 cc. of methyl alcohol was added to the acid aqueous phase, corresponding to 52 µg./cc. of total pigments; pH was adjusted to 7.5 with 32% ammonium hydrate. After 30 minutes of shaking, pH was adjusted to 8.6. The mixture was then extracted with 10 liters of chloroform and shaken for an hour. After separating the organic phase, the extraction was twice repeated with a total amount of 8 liters of the solvent. The extracts collected were concentrated under reduced pressure to about 1.5 liters. They contained 2.58 g. of total pigments determined spectrophotometrically. The extracted solution was then evaporated and the residue was taken up with a small amount of methylene chloride and adsorbed over a column of 75 g. of silicic acid. The column was then eluted with the solvent system methylene chloride/petroleum ether/methanol (100:50:10). Two colored bands were formed. From the more slowly descending colored band 1.65 g. of the amorphous salicyden derivative of dihydrodaunomycin were obtained. This product, crystallized from methanol, gave 1.23 g. of crystals melting at 165–168° C.; found: C, 64.24; H, 5.61; N, 2.13; OCH₃, 4.86. Calculated per $C_{34}H_{35}O_{11}N$: C, 64.44; H, 5.58; N, 2.21; OCH₃ 4.90.

In order to obtain the dihydrodaunomycin hydrochloride, 1 g. of salicylinden derivative was dissolved in 50 cc. of chloroform and extracted three times each with 15 cc. of 0.1 N HCl. The color transferred completely in the aqueous phase, which was made alkaline to a pH 8.6 with 0.1 N NaOH and extracted with chloroform till the extracts were only slightly colored. The chloroform extracts collected and dried over anhydrous sodium sulphate were concentrated under vacuum to about 10 cc. Added were 2.9 cc. of 0.6 N HCl in methanol and ten volumes of anhydrous ethyl ether. The precipitate obtained was crystallized from methanol-dioxane. Yield 0.52 g. of dihydrodaunomycin hydrochloride melting at 204–206° C. (with decomposition) $[\alpha]_D^{20°\,C.} = +188°$ (c.=0.13 in methanol).

By elution of the first colored band of the above-cited column of silicic acid, 800 mg. of an amorphous product consisting of a mixture of pigments were obtained. The product was dissolved in 40 cc. of chloroform and extracted three times each with 10 cc. of 0.1 N HCl. In this way all the pigments were transferred into aqueous phase which was made alkaline to pH 8.6 with 0.1 N NaOH and extracted with chloroform. The three extractions were carried out for total amount of 100 cc. of solvent. The extracts collected together and dried over anhydrous sodium sulphate were concentrated under vacuum to 5 cc., then 1.5 cc. of 0.6 N HCl in methanol and ten volumes of anhydrous ethyl ether were added. 400 mg. of a precipitate were obtained which consisted of a crude hydrochloride which was purified over a column of 100 g. of cellulose powder (Whatman CF 11) buffered with a M/15 phosphate buffer at a pH of 5.4 eluting with butyl alcohol saturated with M/15 phosphate buffer at pH 5.4. Fractions of 25 cc. each were collected. From the fractions 21–50, 85 mg. of a product which consisted partially of daunosaminildaunomycin were obtained. The fractions 51–78 contained pure daunosaminildaunomycin were obtained. The fractions 51–78 contained pure daunosaminildaunomycin. To these fractions added together, were added 350 cc. of ethyl ether and 300 cc. of petroleum ether. It was then extracted three times with water, employing an amount of 450 cc. water. The aqueous phase, at pH 5.4, which now contained all the pigments, was extracted with chloroform and the extract was discarded. The aqueous phase was adjusted to a pH of 8.6 with 0.1 N NaOH. It was extracted with chloroform. Three extractions were carried out for a total amount of 600 cc. The chloroform extracts collected together were dried over anhydrous sodium to about 20 cc. To the concentrate 1.5 cc. of 0.6 N HCl in methanol and ten volumes of anhydrous ethyl ether were added. 200 mg. of amorphous daunosaminildaunomycin hydrochloride were obtained. The precipitate, recrystallized from methanol-isopropanol, gave 150 mg. of crystals of daunosaminildaunomycin hydrochloride melting at 200° C. (with decomposition), $[\alpha]_D^{20°\,C.} = +142°$ (c.=0.1 in M₆OH).

We claim:
1. An antibiotic substance having the formula:

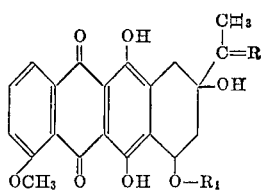

wherein
when R is

$R_1$ is selected from the group consisting of the daunosaminil radical

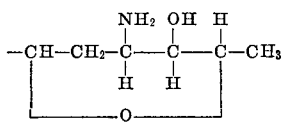

and of hydrogen,
when R is =O, $R_1$ is the daunosaminil radical and a second radical daunosaminil esterifies one of the free hydroxy groups of the molecule,
and its salts with pharmaceutically acceptable non-toxic acids.

2. The compound of claim 1, which is dihydrodaunomycin.
3. The compound of claim 1, which is dihydrodaunomycin hydrochloride.
4. The compound of claim 1, which is daunosaminil-daunomycin.
5. The compound of claim 1, which is daunosaminil-daunomycin hydrochloride.
6. The compound of claim 1, which is dihydrodaunomycinone.

References Cited

UNITED STATES PATENTS 3,590,028   6/1971   Arcamone et al. __ 260—210 AB

OTHER REFERENCES

Iwamoto et al.: "Tetrahedron Letter," No. 36, 1968, pp. 3891–3894.

LEWIS GOTTS, Primary Examiner

J. R. BROWN, Assistant Examiner

U.S. Cl. X.R.

195—80; 260—210 R, 376, 393; 424—180